United States Patent [19]
Saito

[11] Patent Number: 5,812,612
[45] Date of Patent: Sep. 22, 1998

[54] METHOD AND APPARATUS FOR TRANSMITTING AN INTERMITTENT SIGNAL IN A RATIO COMMUNICATION SYSTEM

[75] Inventor: Shin Saito, Kanagawa, Japan

[73] Assignee: Sony Corporation, Tokyo, Japan

[21] Appl. No.: 544,446

[22] Filed: Nov. 17, 1995

[30] Foreign Application Priority Data

Nov. 21, 1994 [JP] Japan ................................. 6-312718

[51] Int. Cl.[6] ..................................................... H04L 27/10

[52] U.S. Cl. .......................... 375/272; 375/278; 375/302; 375/303; 375/308; 455/42; 455/68; 455/113; 455/78

[58] Field of Search ..................................... 375/295, 306, 375/309, 272, 279, 308, 271, 278, 284, 285, 296, 298, 302, 303; 455/42, 63, 68, 71, 78, 83, 86, 89, 91, 113, 119

[56] References Cited

U.S. PATENT DOCUMENTS

| | | | |
|---|---|---|---|
| 4,639,938 | 1/1987 | Kennett | 375/302 |
| 5,130,676 | 7/1992 | Mutz | 375/303 |
| 5,473,290 | 12/1995 | Scomazzon et al. | 375/308 |

Primary Examiner—Don N. Vo
Attorney, Agent, or Firm—Jay H. Maioli

[57] ABSTRACT

A transmitter which can easily suppress diffusion of a spurious signal with a simple constitution, wherein the on/off operations of the transmitting circuit and the carrier signal generating circuit are controlled by the first control signal which rises at the predetermined timing and falls at the predetermined timing, and the on/off operation of the modulator is controlled by the second control signal which gently rises at the same or later timing than the rise timing of the first control signal and gently falls at the same or earlier timing than the fall timing of the first control signal, so that a phenomenon which is similar to pulse modulation of the leaked carrier signal fc becomes hard to be generated, therefore diffusion of the spurious signal can be suppressed.

6 Claims, 6 Drawing Sheets

METHOD AND APPARATUS FOR TRANSMITTING AN INTERMITTENT SIGNAL IN A RATIO COMMUNICATION SYSTEM

BACKGROUND OF THE INVENTION

1. Field of the Invention

This invention relates to a transmitter and radio telephone, and more particularly, is applicable to a digital codeless phone.

2. Description of the Related Art

Heretofore, in a digital cordless phone, apparatus for talking to which a radio circuit is connected by the TDD/FDMA (Time Division Duplex/Frequency Division Multiple Access) system or by the TDD/TDMA (Time Division Duplex/Time Division Multiple Access) system has been known.

For instance, as a typical digital cordless phone of the TDD/FDMA system, the digital cordless phone, which is referred to as CT-2, of which technical standards have been published from ETSI (European Telecommunication Standard Institute) etc. is known.

In this digital cordless phone, the frequency band used (864.15–868.05 [MHz]) is divided into channels of 100 [kHz] to obtain plural communication channels, and communication is performed in such a way that transmission and reception are temporally alternately switched upon a single communication channel. As an example, in the case where the transmitting/receiving data is a voice data, transmission and reception are alternately switched for each 1 [ms]. In this case, in order to avoid conflicts of transmission with reception, a guard band of 3.5 [bit] has been prescribed, by the standards, between transmission and reception.

In this digital cordless phone, ADPCM (Adaptive Differential Pulse Code Modulation) based upon CCITT (Consultative Committee for International Telephone and Telegraph) is employed as the voice coding mode, and frequency-shift modulation of which bandwidth is limited (as a typical example, there is GMSK (Gaussian filtered Minimum Shift Keying)) is employed as the data modulating mode.

Figure 1:
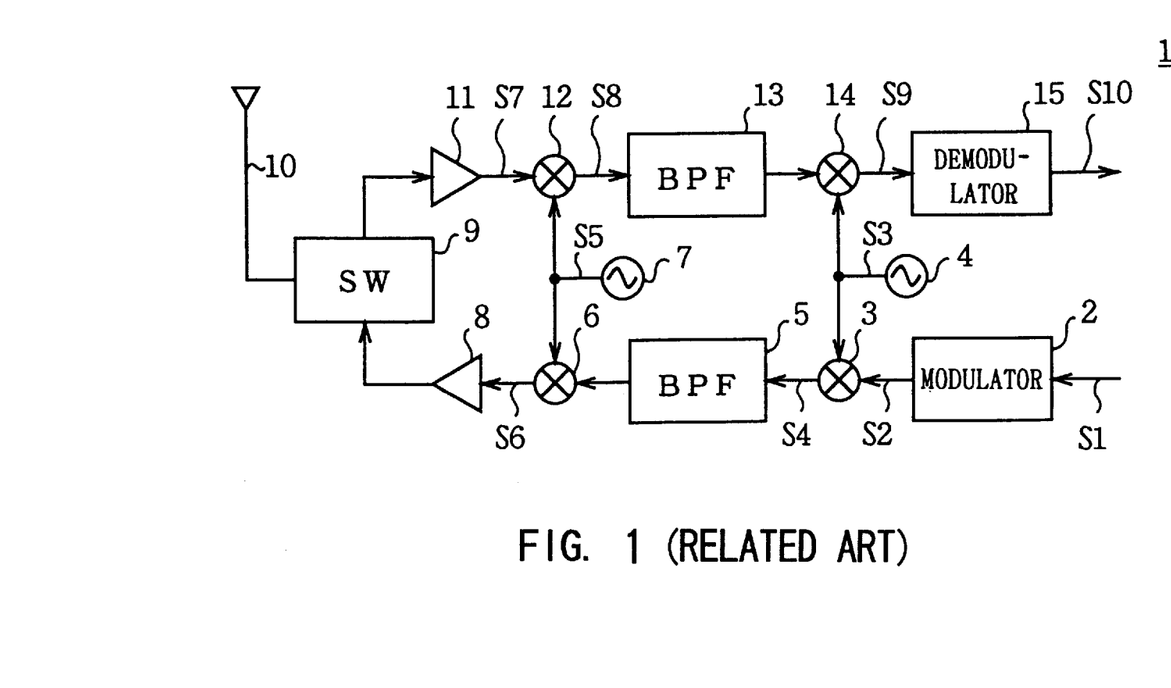
FIG. 1 is a block diagram showing the constitution of a conventional digital cordless phone.

The digital cordless phone is comprised of, for instance, the circuit shown in FIG. 1. As shown in FIG. 1, at the time of transmission, the digital cordless phone 1 performs the GMSK-modulation of the transmitting data S1 which is composed of, for instance, the voice data by the modulator 2, and then outputs the resultant modulated signal S2 to the mixer 3. The mixer 3 performs frequency conversion (up-conversion) of the modulated signal S2, using the local signal S3 of the predetermined frequency generated at the local oscillator 4, and then outputs the resultant intermediate-frequency signal S4 to the mixer 6 via the band pass filter (BPF) 5. The mixer 6 converts the frequency of the intermediate-frequency signal S4 to the frequency of the communication channel, using the local signal S5 of the predetermined frequency generated at the local oscillator 7, and then outputs the resultant transmitting signal S6 from the antenna 10 via the preamplifier 8 and the switch (SW) 9.

On the other hand, at the time of reception, the digital cordless phone 1 inputs the received signal S7 received by the antenna 10, to the mixer 12 via the switch 9 and the preamplifier 11. The mixer 12 performs frequency conversion (down-conversion) of the received signal S7 utilizing the local signal S5 generated at the local oscillator 7, and then outputs the resultant intermediate-frequency signal S8 to the mixer 14 via the band pass filter (BPF) 13. The mixer 14 converts the frequency of the intermediate-frequency signal S8 utilizing the local signal S3 generated at the local oscillator 4, and then outputs the resultant modulated signal S9 to the demodulator 15. The demodulator 15 demodulates the receiving data S10 which is comprised of, for instance, the voice data, from the modulated signal S9 which is GMSK-modulated.

In the digital cordless phone 1, in order that transmission and reception are performed alternately as mentioned above, the modulator 2, the mixers 3, 6, and the preamplifier 8 perform their on/off operations at the same timing (that is, burst operation) by means of the predetermined control signal.

In this connection, the modulator 2 is realized with an orthogonal modulator in general, and is comprised of a carrier generating circuit for generating the carrier fc, a phase shifter for shifting the phase of the carrier fc by 90°, I/Q signal generating circuit for generating the I-signal and the Q-signal which are corresponding to the transmitting data, a mixer for modulating the carrier fc with the I-signal, a mixer for modulating the carrier fc with the Q-signal, an adder, etc. In the modulator 2 constituted in this way, when the burst operation is performed as mentioned above, the on/off operations of the carrier generating circuit, the mixers, and the adder are performed by means of the predetermined control signal.

By the way, in the modulator 2, it is possible that the carrier fc leaks to the extent of −20 to −30 [dBc] or so, owing to the imbalance of the mixers of the modulator 2. This depends greatly on shifting of the DC biases of the I/Q signal generating circuits, and which is an avoidable problem when integrating into an integrated circuit (making into an IC) is performed.

On a state in which the carrier fc has leaked in this way, if the modulator 2, the mixers 3, 6, the preamplifier 8, etc. which are placed on the later stages after the modulator 2 are caused to perform burst operation at the same timing, then the impulse noise is generated on both sides of the carrier fc as if the carrier fc has been pulse-modulated; as a result, it is possible that the signal is diffused and hence the technical standards is not satisfied.

As a method for solving this problem, heretofore, there has been a method for adjusting by a valuable resister the balance of DC biases which are supplied to the mixers of the modulator 2. However, this adjustment is extremely delicate and hence takes much time, and has such a disadvantage that the working efficiency of the manufacturing line is degraded.

As the second method, there has been a method for ramping-up/down (that is, gradual rising/falling) the circuits which are placed on the later stages after the modulator 2. However, to realize this method, it is required to equip the dedicated control circuit and to control the modulator 2 by means of the control signal which is different from the control signal for burst operation, therefore the constitution is unavoidably complicated.

SUMMARY OF THE INVENTION

In view of the foregoing, an object of this invention is to provide a transmitter which can easily suppress diffusion of a spurious with a simple constitution.

The foregoing object and other objects of the invention have been achieved by the provision of a transmitter which comprises a carrier signal generating circuit for generating a carrier signal fc of the predetermined frequency, modulators for modulating the carrier signal fc with the first and the second signals which are corresponding to the transmitting data, transmit circuits for transmitting the modulated signal which is outputted from the modulators and a control circuit for controlling the on/off operations of the carrier signal generating circuit, the modulators and the transmit circuits; wherein the control circuit controls the on/off operations of the transmit circuits and the carrier signal generating circuit by means of the first control signal which rises at the predetermined timing and falls at the predetermined timing, and controls the on/off operation of the modulators by means of the second control signal which gently rises at the same or later timing than the rise timing of the first control signal and gently falls at the same or earlier timing than the fall timing of the first control signal.

The on/off operations of the transmitting circuits and the carrier signal generating circuit are controlled by the first control signal CNT2 which rises at the predetermined timing and falls at the predetermined timing, and the on/off operation of the modulators is controlled by the second control signal which gently rises at the same or later timing than the rise timing of the first control signal and gently falls at the same or earlier timing than the fall timing of the first control signal, so that the on-operation and the off-operation of the modulators are gently performed, therefore a phenomenon which is similar to pulse modulation of the leaked carrier signal fc becomes hard to be generated, therefore diffusion of the spurious signal can be suppressed.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:
(1) The First Embodiment In FIG. 2 which has the same reference numbers as FIG. 1 on their corresponding portions, the reference number 20 shows, as a whole, a CT-2 system digital cordless phone to which the present invention has been applied. A transmitting data S1, which has been outputted from a frame controller 21 and comprised of, for instance, the voice data, is inputted to a modulator 22 and GMSK-modulated hereupon. After that, its frequency is converted to the frequency of the communication channel with a double-conversion system as in the past by means of mixers 3, 6, and then it is transmitted from an antenna 10 as the transmitting signal S6.

Figure 2:
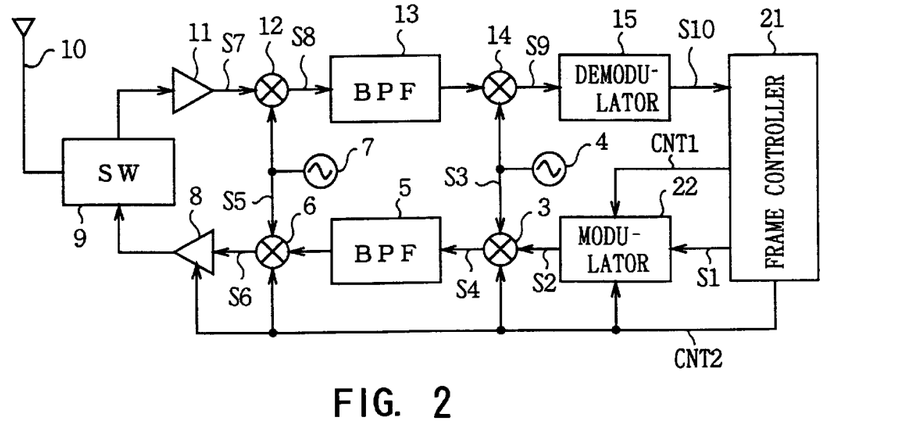
FIG. 2 is a block diagram showing the constitution of a digital cordless phone according to an embodiment of the present invention.

On the other hand, at the time of receiving, the received signal S7, which has been received with the antenna 10, is frequency-converted with the double-conversion system as in the past by means of mixers 12, 14, and then inputted to a demodulator 15 as the modulated signal S9. The demodulator 15 demodulates the modulated signal S9, which had been GMSK-modulated, and then outputs the resultant received data S10, which is comprised of, for instance, the voice data, to a frame controller 21.

The frame controller 21 performs frame management of the transmitting/receiving data S1 and S10, which are comprised of the voice data etc., and performs management of varieties of control data which are related to connection of the radio circuit. Besides, the frame controller 21 generates two different control signals CNT1 and CNT2, and controls the on/off operations of the circuits of the transmitting system (the modulator 22, the mixers 3, 6, and the preamplifier 8) using these control signals CNT1 and CNT2. In this case, the on/off operation of the modulator 22 is controlled using the control signals CNT1 and CNT2, while the on/off operations of the mixers 3, 6 and the preamplifier 8 are controlled using the control signal CNT2.

Figure 3:
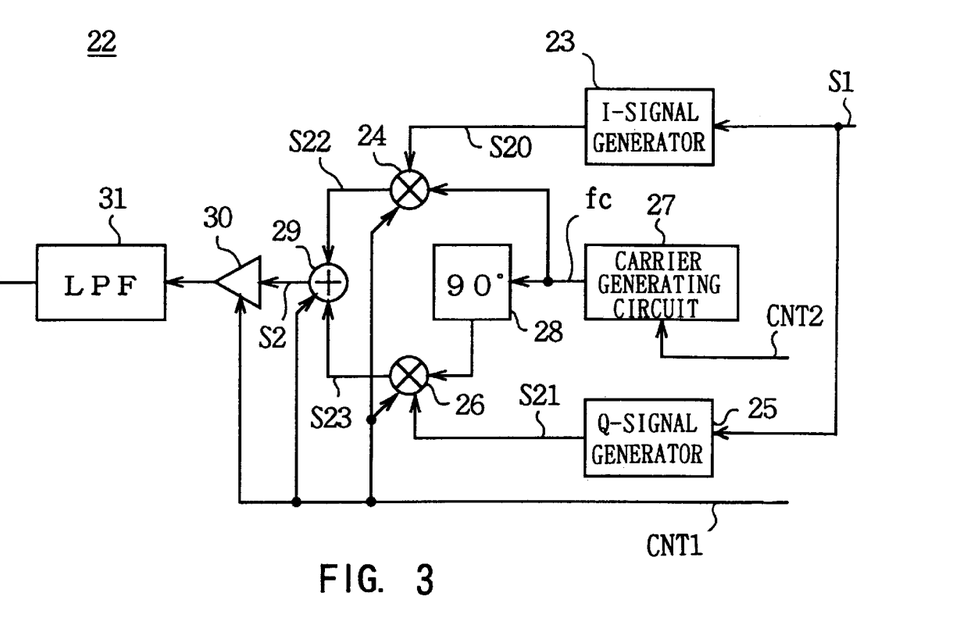
FIG. 3 is a block diagram showing the constitution of the modulator of the digital cordless phone.

As shown in FIG. 3, the modulator 22 is composed of an orthogonal modulator. In this case, an I-signal generating circuit 23 generates an I-signal S20, which is corresponding to the transmitting data S1 and has been subjected to band limitation to the predetermined band, and outputs the I-signal S20 to a mixer 24. A Q-signal generating circuit 25 generates a Q-signal S21, which is corresponding to the transmitting data S1 and has been subjected to band limitation to the predetermined band, and outputs the Q-signal S21 to a mixer 26.

An on/off operation of a carrier generating circuit 27 is controlled by the control signal CNT2, and the carrier generating circuit 27 operates and generates the carrier fc when the control signal CNT2 has become to the level "H", for instance. This carrier fc is inputted to a mixer 24, and also inputted to a mixer 26 after its phase has been shifted by 90° by means of a phase shifter 28.

The mixer 24 multiplies the carrier fc by the I-signal S20, and outputs the resultant modulated signal S22 to an adder 29. Similarly, the mixer 26 multiplies the carrier fc of which phase has been shifted by 90° by the Q-signal S21, and outputs the resultant modulated signal S23 to the adder 29. In this manner, the modulated signals S22 and S23 are added by means of the adder 29, so that the modulated signal S2 which has been GMSK-modulated is obtained. The modulated signal S2 is outputted to the mixer 3 (FIG. 2) which has been placed on the succeeding stage, via a preamplifier 30 and a low-pass filter (LPF) 31 of which cut-off frequency has been set to the predetermined frequency.

In this case, the on/off operations of the mixers 24, 26, the adder 29, and the preamplifier 30 are controlled by the control signal CNT1 which is differ from the control signal CNT2, and activated when the control signal CNT1 becomes; for instance, the level "H".

The control signals CNT1 and CNT2 are produced to be the waveform shown in FIGS. 4A to 4D, on the basis of timing management based on the guard-band standard. More specifically, the control signal CNT2 rises within the range which is extending from the point of time t1 which precedes the rising of the Q-signal S21 by 2.25 bits till the point of time t4 of rising of the Q-signal S21, and also falls within the range which is extending from the point of time t5 of falling of the Q-signal S21 till the point of time t8 which succeeds the point of time t5 of the falling by 2.25 bits. In this connection, in the case of this embodiment, because ramp-up/down is performed in an amount of one bit with respect to the Q-signal S21, the control signal CNT2, in fact, rises before the point of time t2 and falls after the point of time t7.

On the other hand, the control signal CNT1 rises within the range which is extending from the point of time t1 which precedes the point of time t4 of rising of the Q-signal S21 by 2.25 bits till the point of time t3 which precedes the point of time t4 of the rising of the Q-signal S21 by 0.5 bit. Also, the control signal CNT1 falls within the range which is extending from the point of time t6 which succeeds the point of time t5 of falling of the Q-signal S21 by 0.5 bit till the point of time t8 which succeeds the point of time t5 of the falling of the Q-signal S21 by 2.25 bits. In this connection, one bit corresponds to about 13.89 [$\mu$S].

In the case of this embodiment, as shown in FIGS. 4A to 4D, the control signal CNT1 rises gently and falls gently. Besides, the timing of rising of the control signal CNT1 becomes later than the timing of the control signal CNT2, and the timing of falling of the control signal CNT1 becomes earlier than the timing of the control signal CNT2. In this connection, the sloped portion of the control signal CNT1 is produced by means of a digital-to-analog conversion circuit, in the frame controller 21.

By controlling the operation of the carrier generating circuit 27 by means of the control signal CNT2 as well as controlling the operations of the mixers 24, 26, the adder 29, and the preamplifier 30 by means of the control signal CNT1 which gently rises later and gently falls earlier than the control signal CNT2, in the above constitution, the mixers 24, 26, the adder 29, and the preamplifier 30 gently rise later and gently fall earlier. In other words, the mixers 24, 26, the adder 29, and the preamplifier 30 perform ramp-up/ operations. By this operation, a phenomenon which is similar to pulse modulation of the leaked carrier fc becomes hard to be generated, as a result the impulse noise which has been formerly generated can be suppressed, so that diffusion of the spurious signal can be easily suppressed.

By suppressing diffusion of the spurious signal in this manner, the conventional complicated adjustment becomes needless, and the constitution can be simplified as compared to the case where the dedicated control circuit for controlling the transmitting system is separately provided as before. If diffusion of the spurious signal is suppressed in this manner, when the modulator 22 and its peripheral circuits are integrated to form an IC, the integration becomes much easier.

According to the above constitution, the on/off operation of the carrier generating circuit 27 is performed by means of the control signal CNT2, and the on/off operations of the mixers 24, 26, the adder 29, and the preamplifier 30 are performed by means of the control signal CNT1 which gently rises later and gently falls earlier than the control signal CNT2, so that the impulse noise which has been formerly generated can be suppressed. Therefore, diffusion of the spurious signal can be easily suppressed.

(2) The Second Embodiment

In this second embodiment, a description is given of the case where the sloped portion of the control signal CNT1 is produced on the basis of a time constant which is determined by a resistance and a capacitance.

Figure 5:
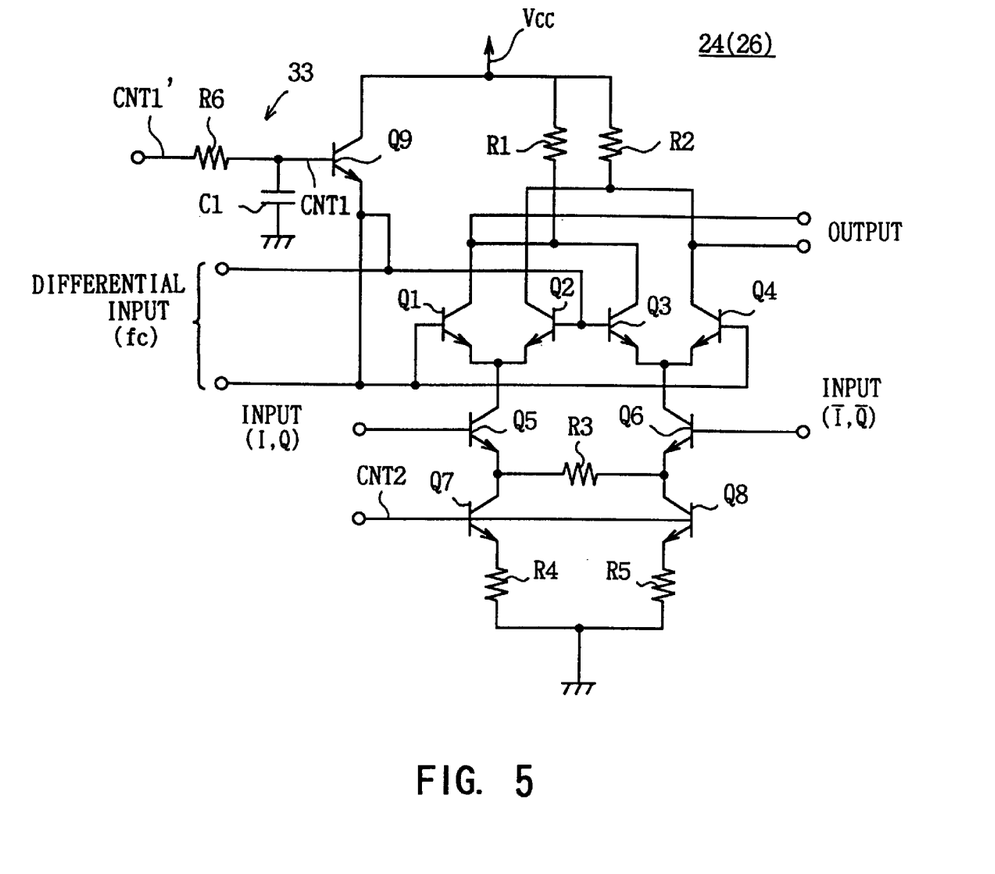
FIG. 5 is a connection diagram showing the constitution of the mixer.

As shown in FIG. 5, most of the mixer 24 (or 26) is comprised of two sets of differential pairs (Q1 and Q2; and Q3 and Q4) for forming a differential-input stage, transistors Q5 and Q6 which are connected to the lower stage of that differential pairs as a signal-input stage, and transistors Q7 and Q8, which are connected to the further lower stage, for forming a current source. In this mixer 24 (or 26), the I-signal (or the Q-signal) is inputted to the signal-input stage and the carrier fc is inputted to the differential-input stage, and then a result of multiplication of the I-signal (or the Q-signal) by the carrier fc is outputted from the output terminal.

Figures 4A, 4B:
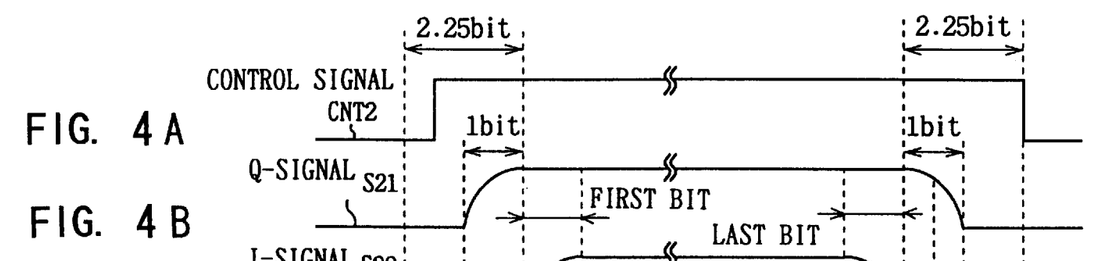
FIGS. 4A to 4D are schematic diagrams showing the waveforms of control signals for controlling the on/off operations.
Figures 4C, 4D:
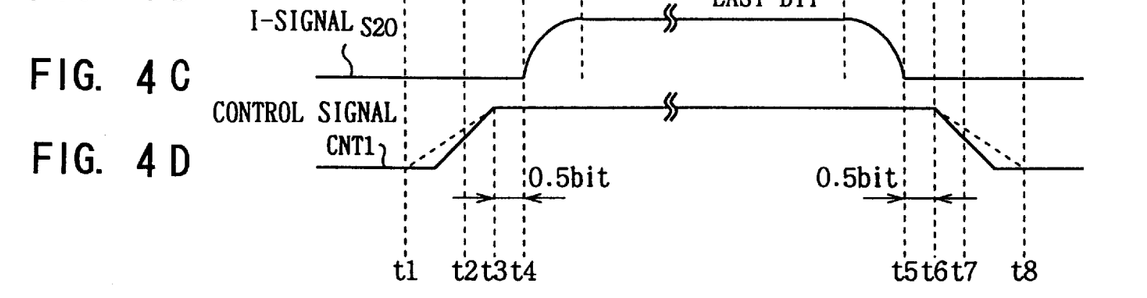

On a base of a transistor Q9 for supplying DC bias to the differential-input stage, a bias control circuit 33 which is comprised of a resistor R6 and a capacitor C1 is provided. To this bias control circuit 33, a rectangular control signal CNT1' is inputted which has prescribed only the rise and fall timings of the control signal CNT1 outputted from the frame controller 21. The bias control circuit 33 dulls the rising and the falling of the control signal CNT1' by means of the time constant which is determined by the resistor R6 and the capacitor C1 so as to produce the control signal CNT1 shown in FIG. 4, and then outputs the control signal CNT1 to the base of the transistor Q9 so as to control the DC bias of the mixer 24 (or 26).

In this case, the control signal CNT2 is being inputted to the bases of the transistors Q7 and Q8, and the mixer 24 (or 26) has been arranged such that the on/off operation of it is controlled by the control signal CNT2. However, because the DC bias is controlled by the control signal CNT1' as mentioned above, the mixer 24 (or 26) acts on the basis of the control signal CNT1 in practice, and performs the ramp-up/down operation in the same way as the first embodiment.

Figure 6:
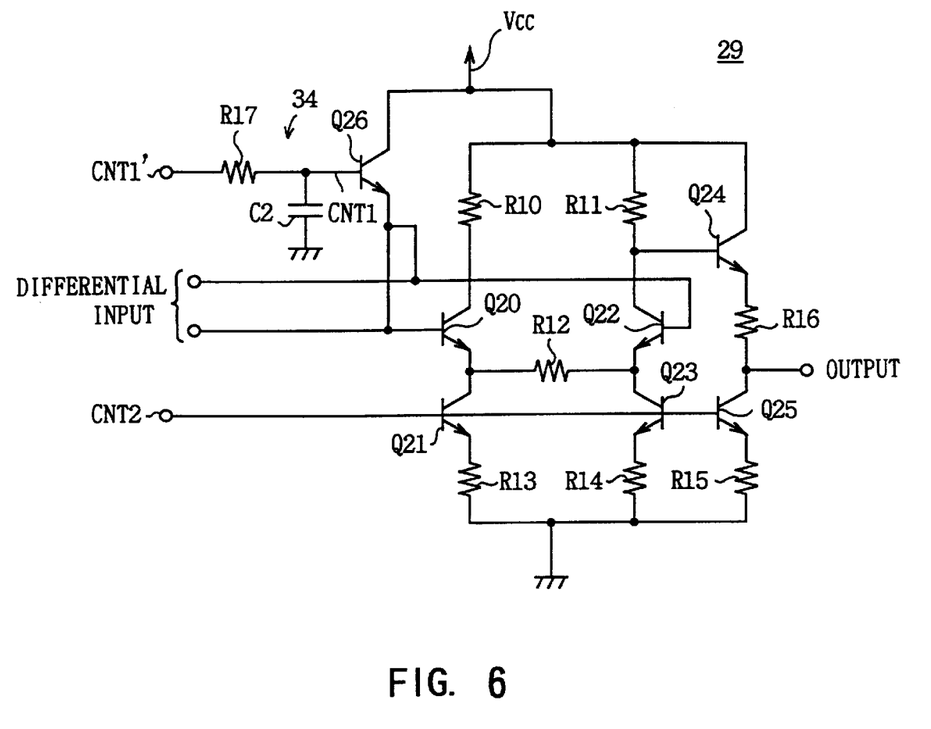
FIG. 6 is a connection diagram showing the constitution of the adder.

As shown in FIG. 6, most of the adder 29 is comprised of a differential pair (Q20 and Q22) for forming a differential-input stage, transistors Q21 and Q23, which are connected to the lower stage, for forming a current source, and transistors Q24 and Q25 for forming an output stage. In this adder 29, the outputs of the mixers 24, 26 are inputted to the differential-input stage, and then the result of addition of the outputs of the mixers 24, 26 is outputted from the output terminal.

On a base of a transistor Q26 for supplying DC bias to the differential-input stage, a bias control circuit 34 is provided which is comprised of a resistor R17 and a capacitor C2. To this bias control circuit 34, the control signal CNT1' is inputted as in the case of the mixer 24 (or 26). The bias control circuit 34 dulls the rising and the falling of the control signal CNT1' by means of the time constant which is determined by the resistor R17 and the capacitor C2 so as to produce the control signal CNT1 shown in FIG. 4, and then outputs this control signal CNT1 to the base of the transistor Q26 and controls the DC bias of the adder 29.

In this case too, the control signal CNT2 is being inputted to the bases of the transistors Q21, Q23 and Q25, and the on/off operation of the adder 29 is controlled by the control signal CNT2. However, because the DC bias is controlled by the control signal CNT1' as mentioned above, the adder 29 acts on the basis of the control signal CNT1 in practice, and performs the ramp-up/down operation in the same way as the first embodiment.

Figure 7:
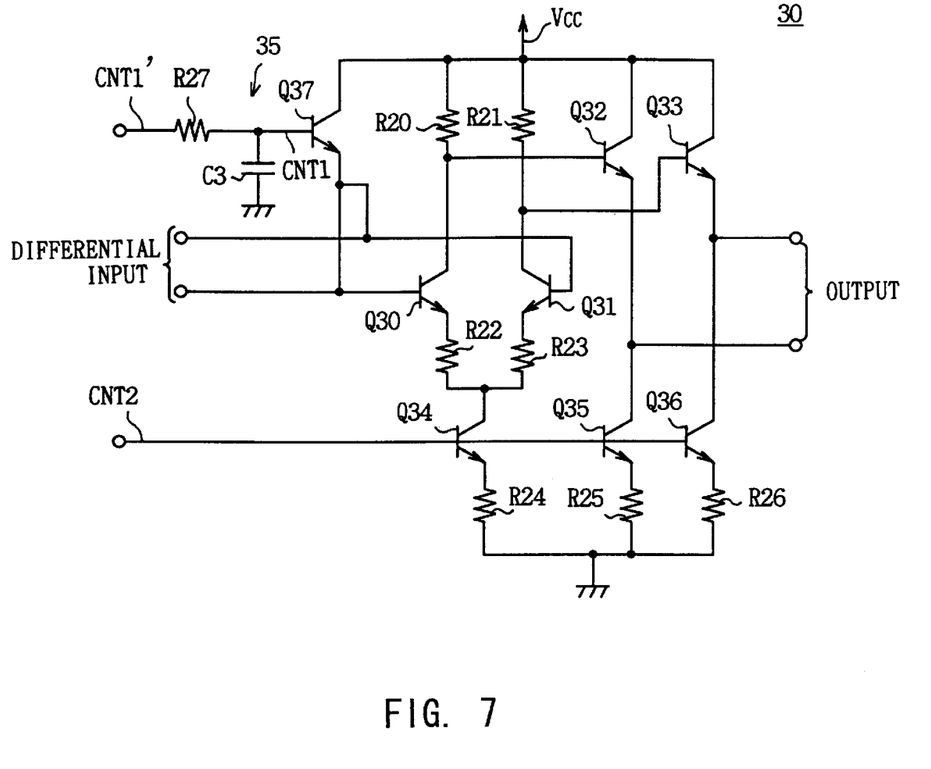
FIG. 7 is a connection diagram showing the constitution of the preamplifier.

As shown in FIG. 7, most of the preamplifier 30 is comprised of a differential pair (Q30 and Q31) for forming a differential-input stage, transistor Q34, which is connected to the lower stage, for forming a current source, and transistors Q32, Q33, Q35 and Q36 for forming an output stage, and having the constitution of a differential amplifier. In this preamplifier 30, the output of the adder 29 is inputted to the differential-input stage, and the amplified signal is outputted from the output terminal.

On a base of a transistor Q37 for supplying DC bias to the differential-input stage, a bias control circuit 35 is provided which is comprised of a resistor R27 and a capacitor C3. To this bias control circuit 35, the same control signal CNT1' as the case of the mixer 24 (or 26) is inputted. The bias control circuit 35 dulls the rising and the falling of the control signal CNT1' by means of the time constant which is determined by the resistor R27 and the capacitor C3 so as to produce the control signal CNT1 shown in FIG. 4, and then outputs this control signal CNT1 to the base of the transistor Q37 and controls the DC bias of the preamplifier 30.

In this case too, the control signal CNT2 is being inputted to the bases of the transistors Q34 to Q36, and the preamplifier 30 performs the on/off operation on the basis of the control signal CNT2. However, because the DC bias is controlled by the control signal CNT1' as mentioned above, the preamplifier 30 acts on the basis of the control signal CNT1 in practice, and performs the ramp-up/down operation in the same way as the first embodiment.

According to the above constitution, the sloped portion of the control signal CNT1 is produced by means of a time constant which is determined with a resistor and a capacitor, so that the constitution can be further simplified. Particularly, it is suited for the case where the frame controller 21 and the modulator 22 are united into an IC.

(3) Other Embodiments

The embodiment discussed above have dealt with the case where the circuits of the transmission system which have been provided in the later stages than the modulator 22 is controlled by the control signal CNT2. However, the present invention is not to be limited to this, but in the case where the modulator 22, the frame controller 21, and the circuits of the transmission system which have been provided in the later stages than the modulator 22 are to be united into an IC, the circuits of the transmission system which have been provided in the later stages than the modulator 22 can be controlled by the control signal CNT1. In this case, diffusion of a spurious signal can be further suppressed.

Further, the embodiment discussed above have dealt with the case where the mixers 24, 26, the adder 29, and the preamplifier 30 which are contained in the modulator 22 are all controlled by the control signal CNT1. However, the present invention is not to be limited to this, but any one of the mixers 24, 26, the adder 29, and the preamplifier 30 can be controlled by the control signal CNT1.

Further, the embodiments discussed above have dealt with the case where the mixers 24, 26, the adder 29, and the preamplifier 30 are comprised of transistors. However, the present invention is not to be limited to this, and the mixers, the adder, and the preamplifier can be comprised of some elements such as FETs (Field-Effect Transistors).

Further, the embodiments discussed above have dealt with the case where the control signal CNT1 rises later than the control signal CNT2 and falls earlier than the control signal CNT2. However, the present invention is not to be limited to this, but if the control signal CNT1 gently rises and gently falls, the same timings as of the control signal CNT1 can be employed.

Further, the embodiment discussed above have dealt with the case where the transmission system and the reception system are constituted with the double-conversion mode. However, the present invention is not to be limited to this, but the transmission system and the reception system can be constituted with a single-conversion mode.

Furthermore, in the embodiment discussed above, the digital cordless phone of CT-2 system has been described. However, the present invention is not to be limited to this, but is also applicable to the digital cordless phone which is based on the other system, such as GSM (Group Special Mobile) system which is diffused in Europe.

According to the present invention described above, the on/off operations of the transmitting circuit and the carrier signal generating circuit are controlled by the first control signal which rises at the predetermined timing and falls at the predetermined timing, and the on/off operation of the modulator is controlled by the second control signal which gently rises at the same or later timing than the rise timing of the first control signal and gently falls at the same or earlier timing than the fall timing of the first control signal, so that the modulator gently performs its on-operation and gently performs its off-operation, therefore diffusion of the spurious can be easily suppressed. As a result, a transmitter which is able to easily suppress diffusion of a spurious signal with a simple constitution can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmitter comprising a carrier signal generating circuit for generating a carrier signal of a predetermined frequency, a modulator for modulating said carrier signal with first and second signals corresponding to transmitting data, a transmit circuit for transmitting a modulated signal output from said modulator, and a control circuit for controlling on/off operations of said carrier signal generating circuit, said modulator, and said transmit circuit, wherein said control circuit includes:

first means for controlling the on/off operations of said transmit circuit and said carrier signal generating circuit by a first control signal which rises at a predetermined timing and falls at a predetermined timing; and second means for controlling the on/off operation of said modulator by a second control signal which gently rises at the same or later timing than the rise timing of said first control signal and gently falls at the same or earlier timing than the fall timing of said first control signal.

2. The transmitter according to claim 1, wherein said modulator is comprised of an orthogonal modulator formed with a first mixer for multiplying said carrier signal into said first signal, a second mixer for multiplying said carrier signal the phase of which has been shifted by 90° into said second signal, an adder for adding a result of the multiplication by said first mixer to a result of the multiplication by said second mixer, and an amplifier for amplifying a result of the addition by said adder, wherein at least one of said first mixer, said second mixer, said adder, and said amplifier is controlled by said second control signal.

3. The transmitter according to claim 2, wherein direct-current biases of said first mixer, said second mixer, said adder, and said amplifier are respectively controlled by said second control signal.

4. A system for a TDMA two-way radio including a transmitting device for transmitting an RF signal intermittently and a receiving device for receiving an RF signal intermittently, wherein said system comprises a carrier signal generating circuit for generating a carrier signal of a predetermined frequency, a modulator for modulating said carrier signal with first and second signals corresponding to transmitting data, a transmit circuit for transmitting a modulated signal output from said modulator, and a control circuit for controlling on/off operations of said carrier signal generating circuit, said modulator, and said transmit circuit, wherein said control circuit includes:

first means for controlling the on/off operations of said transmit circuit and said carrier signal generating circuit by a first control signal which rises at a predetermined rise timing and falls at a predetermined fall timing; and second means for controlling the on/off operation of said modulator by a second control signal which gently rises at the same or later timing than the rise timing of said first control signal and gently falls at the same or earlier timing than the fall timing of said first control signal.

5. The system according to claim 4, wherein said modulator is comprised of an orthogonal modulator formed with a first mixer for multiplying said carrier signal into said first signal, a second mixer for multiplying said carrier signal whose phase has been shifted by 90° into said second signal, an adder for adding a result of the multiplication by said first mixer to a result of the multiplication by said second mixer, and an amplifier for amplifying a result of the addition by said adder; and at least one of said first mixer, said second mixer, said adder, and said amplifier is respectively controlled by said second control signal.

6. The system according to claim 5, wherein direct-current biases of said first mixer, said second mixer, said adder, and said amplifier are respectively controlled by said second control signal.

* * * * *